(12) United States Patent
Berger et al.

(10) Patent No.: US 10,310,982 B2
(45) Date of Patent: Jun. 4, 2019

(54) TARGET CACHE LINE ARBITRATION WITHIN A PROCESSOR CLUSTER

(71) Applicant: INTERNATIONAL BUSINESS MACHINES CORPORATION, Armonk, NY (US)

(72) Inventors: Deanna Postles Dunn Berger, Hyde Park, NY (US); Johnathon J. Hoste, Poughkeepsie, NY (US); Pak-kin Mak, Poughkeepsie, NY (US); Arthur J. O'Neill, Jr., Poughkeepsie, NY (US); Robert J. Sonnelitter, III, Wappingers Falls, NY (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 133 days.

(21) Appl. No.: 15/380,082

(22) Filed: Dec. 15, 2016

(65) Prior Publication Data

US 2018/0173630 A1 Jun. 21, 2018

(51) Int. Cl.
*G06F 12/14* (2006.01)
*G06F 12/0862* (2016.01)
*G06F 12/0853* (2016.01)

(52) U.S. Cl.
CPC ...... *G06F 12/0862* (2013.01); *G06F 12/0853* (2013.01); *G06F 2212/602* (2013.01)

(58) Field of Classification Search
CPC ............ G06F 12/0862; G06F 12/0853; G06F 2212/602

USPC .......................................................... 711/137
See application file for complete search history.

(56) References Cited

U.S. PATENT DOCUMENTS

| 6,480,918 | B1 | 11/2002 | McKenney et al. |
|---|---|---|---|
| 7,325,101 | B1 | 1/2008 | Iacobovici et al. |
| 7,337,279 | B2 | 2/2008 | Glasco |
| 7,853,755 | B1 | 12/2010 | Agarwal et al. |
| 8,762,651 | B2 | 6/2014 | Blake et al. |
| 2003/0093624 | A1 | 5/2003 | Arimilli et al. |
| 2004/0230750 | A1 | 11/2004 | Blake et al. |
| 2006/0117147 | A1* | 6/2006 | Blinick ............... G06F 12/0831 711/145 |
| 2016/0147661 | A1 | 5/2016 | Ambroladze et al. |

* cited by examiner

*Primary Examiner* — Jae U Yu
(74) *Attorney, Agent, or Firm* — Cantor Colburn LLP; William Kinnaman

(57) ABSTRACT

A computer-implemented method for managing cache memory in a distributed symmetric multiprocessing computer is described. The method may include receiving, at a first central processor (CP) chip, a fetch request from a first chip. The method may further include determining via address compare mechanisms on the first CP chip whether one or more of a second CP chip and a third CP chip is requesting access to a target line. The first chip, the second chip, and the third chip are within the same chip cluster. The method further includes providing access to the target line if both of the second CP chip and the third CP chip have accessed the target line at least one time since the first CP chip has accessed the target line.

20 Claims, 4 Drawing Sheets

TARGET CACHE LINE ARBITRATION WITHIN A PROCESSOR CLUSTER

BACKGROUND

The present disclosure relates to symmetric multiprocessing systems (SMPs), and more specifically, to hot cache line arbitration within a processor cluster of multiple chip multiprocessors in a highly distributed SMP system.

In a highly distributed large symmetric multiprocessing (SMP) systems with decentralized cache line access arbitration, the amount of system time spent on cache to cache intervention for a common semaphore/lock address can be significantly higher than the lock time per processor, which may cause system responsiveness issues. As the SMP size continues to grow, this responsiveness issue will also grow.

It may be advantageous to ensure locking fairness across multiple processors and to improve locked time efficiency by minimizing the time an available semaphore/lock address is in transit between processors.

SUMMARY

According to an embodiment of the present invention, a computer-implemented method for managing cache memory in a distributed symmetric multiprocessing computer is described. The method may include receiving, via a storage controller, a fetch request from a first central processor (CP) chip. The method may further include determining whether one or more of a second CP chip and a third CP chip is requesting access to a target line, and providing access to the target line if both of the second CP chip and the third CP chip have accessed the target line at least one time since an earlier fetch from the first CP chip has accessed the target line.

According to other embodiments, a system for managing cache memory in a distributed symmetric multiprocessing computer is described. The system may include a chip cluster having a first CP chip, a second CP chip, and a third CP chip. The system is configured to receive a fetch request from the first CP. The system is configured to determine whether one or more of the second CP chip and the third CP chip is requesting access to a target line, and provide access to the target line if both of the second CP chip and the third CP chip have accessed the target line at least one time since an earlier fetch from the first CP has accessed the target line.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

Figure 1:
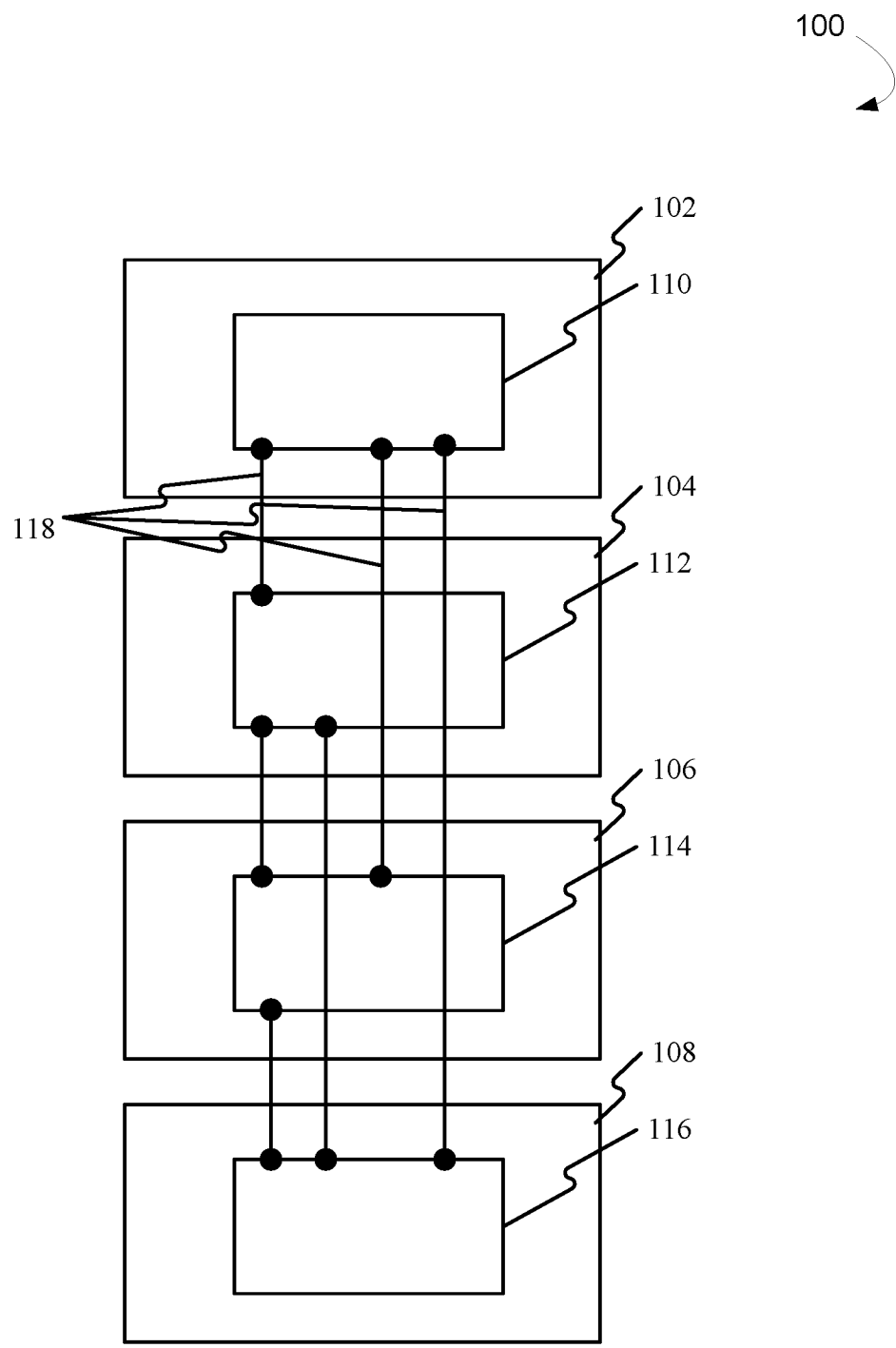
FIG. 1 depicts a distributed symmetric multiprocessing (SMP) system, according to one or more embodiments.

Symmetric multiprocessing ("SMP") is the processing of computer instructions and/or programs by multiple processors under the control of a single operating system ("OS") using a common memory and/or input/output ("I/O") devices. By leveraging the processing power of multiple independent processors, such as sixty four processors for example, SMP systems may be able to generate significant computing power. As such, SMP systems can provide a more economical alternative to super computers or mainframes that typically rely on a small number of more expensive, custom-designed processors.

SMP systems employ multiple interconnected processors that cooperate and communicate with each other. There are a variety of factors, however, that can affect how efficiently the processors within an SMP system can communicate with each other, and, thus, how efficiently the SMP system can operate. One factor that affects the communication between the processors in an SMP system is the available data rate of the connections between the processors, which is referred to as the bandwidth. Higher bandwidth connections between processors enable more data to be communicated between two processors in a given period of time as compared to lower bandwidth connections.

Historically system architects have used various means to achieve high performance in large tightly coupled symmetrical multiprocessor (SMP) computer systems. They range from coupling individual processors or processor clusters via a single shared system bus, to coupling processors together in a cluster, whereby the clusters communicate using a cluster-to-cluster interface, to a centrally interconnected network where parallel systems built around a large number (ie. 32 to 1024) of processors are interconnected via a central switch (i.e. a cross-bar switch).

The shared bus method usually provides the most cost efficient system design since a single bus protocol can service multiple types of resources. Furthermore, additional processors, clusters or peripheral devices can be attached economically to the bus to grow the system. However, in large systems the congestion on the system bus coupled with the arbitration overhead tends to degrade overall system performance and yield low SMP efficiency. These problems can be formidable for symmetric multiprocessor systems employing processors running at frequencies in excess of 500 MHz.

The centrally interconnected system usually offers the advantage of equal latency to shared resources for all processors in the system. In an ideal system, equal latency allows multiple applications, or parallel threads within an application, to be distributed among the available processors without any foreknowledge of the system structure or memory hierarchy. These types of systems are generally implemented using one or more large cross-bar switches to route data between the processors and memory. The underlying design often translates into large pin packaging requirements and the need for expensive component packaging. In addition, it can be difficult to implement an effective shared cache structure.

The tightly coupled clustering method serves as the compromise solution. In this application, the term cluster refers to a collection of processors sharing a single main memory, and whereby any processor in the system can access any portion of the main memory, regardless of its affinity to a particular cluster. Unlike Non-Uniform Memory Access (NUMA) architectures, the clusters referred to in our examples utilize dedicated hardware to maintain data coherency between the memory and second level caches located within each cluster, thus presenting a unified single image to the software, void of any memory hierarchy or physical partitions such as memory bank interleaves. One advantage of these systems is that the tightly coupled nature of the processors within a cluster provides excellent performance when the data remains in close proximity to the processors that need it. For example if the data resides in a cluster's second level cache or the memory bank interleaves attached to that cluster. In addition, it usually leads to more cost-efficient packaging when compared to the large N-way cross-bar switches found in the central interconnection systems. However, the clustering method can lead to poor performance if processors frequently require data from other clusters, and the ensuing latency is significant, or the bandwidth is inadequate.

FIG. 1 depicts a distributed symmetric multiprocessing (SMP) system 100 (hereafter "system 100") in accordance with one or more embodiments. System 100 can include 4 processing units or "drawers." Drawer 102 (described in greater detail with respect to FIG. 2) connects to drawer 104, drawer 106, and drawer 108 via a storage controller (SC) chip 110. Drawers 104, 106, and 108 each have a respected SC chip (e.g., SC chip 112, SC chip 114, SC chip 116). Bus lines 118 connect drawers 102, 104, 106, and 108.

Figure 2:
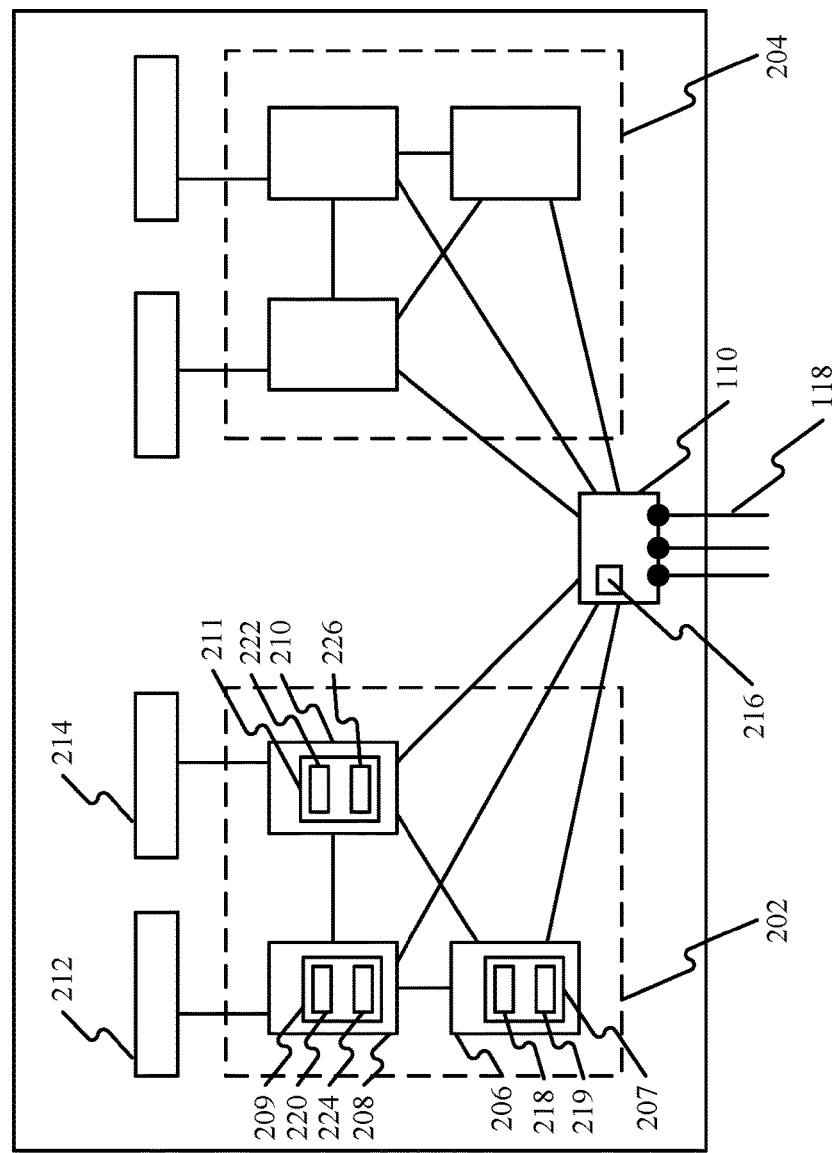
FIG. 2 depicts a drawer, according to one or more embodiments.

FIG. 2 depicts drawer 102 in greater detail, according to one or more embodiments. Although FIG. 2 depicts only drawer 102, it should be appreciated that a similar configuration is contemplated for drawers 104, 106, and 108, and/or other drawers in system 100.

Referring now to FIG. 2, drawer 102 includes two central processor (CP) clusters 202 and 204. A cluster includes three central processor (CP) chips operatively connected to a storage controller (SC) chip. For example, CP cluster 202 includes CP chip 206, CP chip 208, and CP chip 210. Each respective CP chip is connected to a system memory (e.g., system memory 212 and system memory 214). SC chip 110 is operatively connected with each of the other clusters via bus lines 118. In other aspects, a CP cluster may include any number of CP chips, although embodiments are described as having only three.

Figure 3:
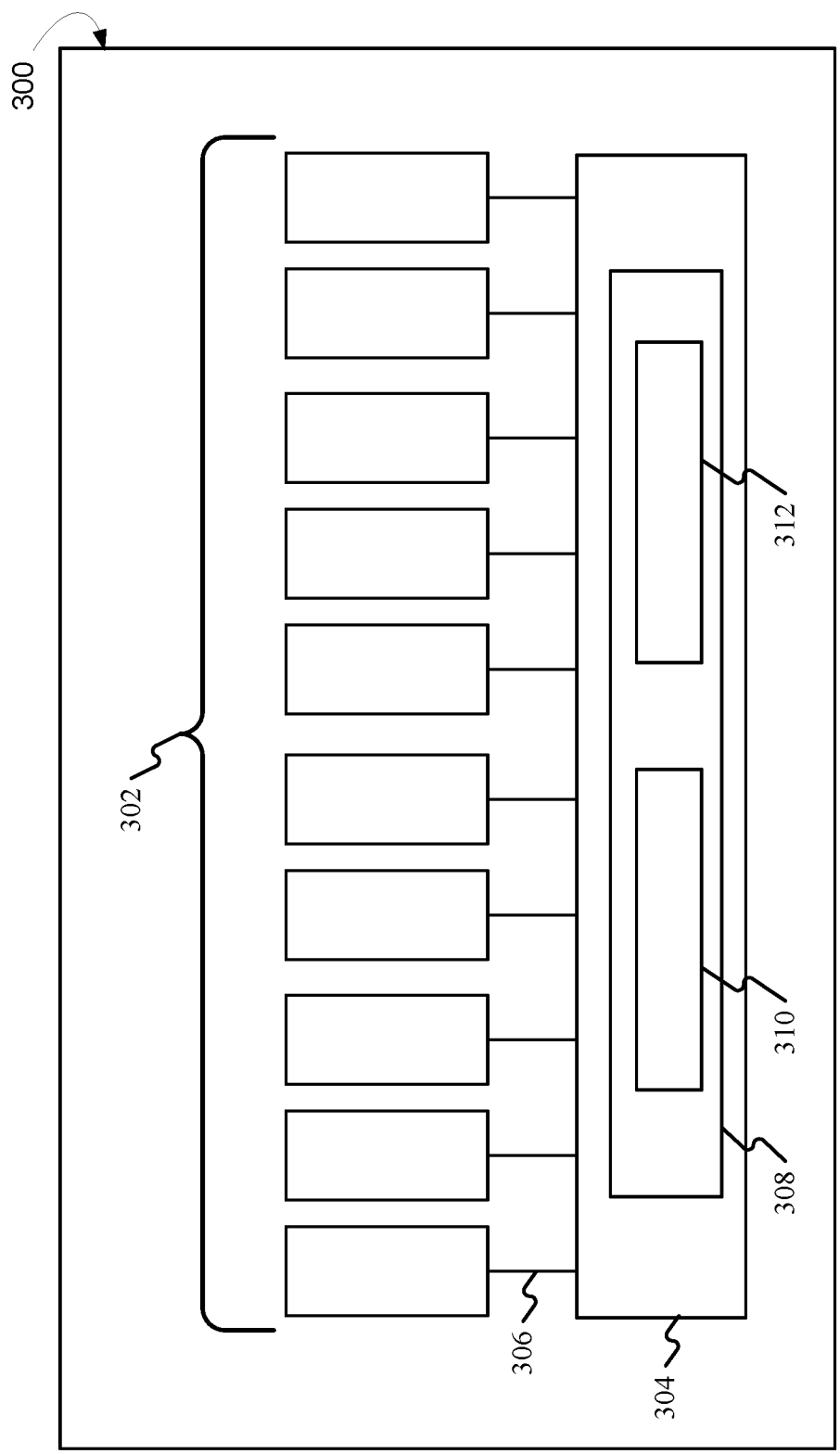
FIG. 3 depicts a CP chip, according to one or more embodiments.

Now considering a CP chip in greater detail, FIG. 3 depicts a CP chip 300, according to one or more embodiments. Although FIG. 3 depicts only one CP chip 300, it should be appreciated that a similar configuration is contemplated for other CP chips in the system such as CP chips 206, 208, and 210. Referring now to FIG. 3, CP chip 300 can include up to 10 processors 302 and a level 3 (L3) cache 304. Processors 302 operatively connect to L3 cache 304 by cache bus lines 306. L3 cache 304 may be configured with L3 cache logic 308 for cache line arbitration between CP chips within a chip cluster (e.g., CP chips 206, 208, and 210 within CP cluster 202).

L3 cache logic may be configured to implement a decentralized cache line access arbitration system that implements locking fairness across multiple processors in the SMP system by minimizing the time an available lock address is in transit between processors. L3 cache logic 308 may include an LFAR logic (controller) 310, which may perform arbitration functions between the CP chips like triggering the set of extended valid tags and broadcasting fetch requests, among other functions. L3 cache logic 308 may also include an RFAR logic (controller) 312 that may function as an on-chip cache that receives broadcasted requests from other CP chips in the cluster and manages the extended valid tags. CP chip 300 may exemplify CP chips 206, 208, and 210 as shown in FIG. 2.

Referring again to FIG. 2, CP chip 206 may include an L3 cache 207. L3 cache 207 can include LFAR logic 218 and an RFAR logic 219. CP chip 208 can include an L3 cache 209. L3 cache 209 can include LFAR logic 220 and RFAR logic 224. CP chip 210 may include an L3 cache 211. L3 cache 211 can include an LFAR logic 222 and an RFAR logic 226.

Multiple CP chips in a common CP cluster may simultaneously request the same bus line. For example, in an SMP design as shown in FIG. 2 where multiple CP chips are grouped within a cluster, a shared hot target cache line could be bounced back and forth between two CP chips on the cluster (e.g., CP chip 206 and CP chip 208), while requests from a third CP chip (e.g., CP chip 210) get disproportionately starved out. The bounce back and forth is sometimes referred to as a "food fight" between the CP chips. Embodiments of the present invention may improve locked time efficiency by minimizing the time an available semaphore/lock address is in transit between processors by forcing each CP chip in the same cluster to have access to the hot line (also referred herein as a "target line) once before allowing any CP chip a second access to the line.

For a hot cache line food fight in the system, if the cache line arbitration is biased for local processors first (e.g., CP chips 206 and 208) the local processors may be in a fetch loop and this can create a system wide starvation where non-local processors (e.g., processors in CP cluster 204) may take a very long time before being able to access the cache line or may time out. To avoid the starvation or time out, the arbitration logic was designed to bias toward the non-local operations first. The consequence of this bias is that moving the locked address from the owning processor to a non-local processor on another cluster takes thousands of cycles rather than tens of cycles if the cache line was moved to a nearer by local processor (i.e., a cluster of local CP chips).

Furthermore, when the semaphore is frequently used by 100's of processors, the total time spent moving the cache line from one processor to another would be the number of competing processors (of which there may be several hundred) multiplied by the 1000's of cycles per transfer (100's× 1000's). This does not include the locked time which is the time the lock is set by the processor until when it is released.

In some aspects, a majority of the fetch requests come from the local Fetch/Store controllers at each CP chip (e.g., L3 cache 207, 209, and 211). These requests are broken down into fetch requests known as LFAR requests (originating from LFAR logic 218, 220, and 222, for example) and store requests known as LSAR requests (originating from the RFAR logic 219, 224, and 226 for example). CFAR are fetch requests originating from the CFAR logic 216. According to some embodiments, cache line arbitration amongst the three CP chips in a cluster is managed by CFAR logic 216 operating in the SC chip 110, and LFAR logic 218, 220 and 222 operating in the L3 cache 207, 209, and 211 of each of CP chips 206, 208, and 210 (respectively).

Embodiments of the present invention may include a mechanism to ensure on-cluster fairness by allowing each CP chip request in the cluster to complete once before line is evicted to an off-cluster requestor. Embodiments of the present invention may insure that each of the chips on the cluster are allowed access to a hot line once before one of the those chips on the same cluster is allowed to access the shared line a second time.

Figure 4:
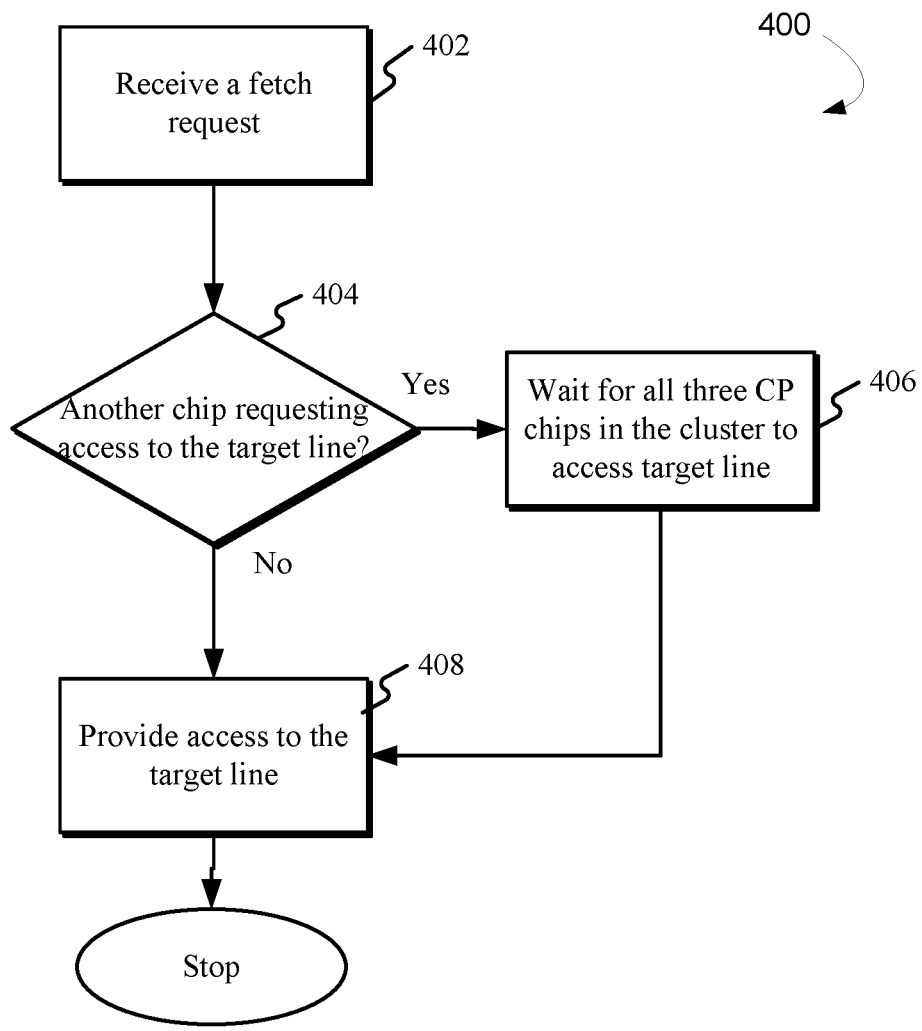
FIG. 4 depicts a flow diagram of a method for managing cache memory in the distributed symmetric multiprocessing system of FIG. 1, according to one or more embodiments.

FIG. 4 depicts a flow diagram of a method 400 for managing cache memory in the distributed symmetric multiprocessing system of FIG. 1, according to one or more embodiments. Referring now to FIG. 4, SC chip 110 may receive a fetch request from CP chip 206, as shown in block 402. A fetch request may be, for example, a local core or IO request, or some other request for exclusive access to one or more bus lines 118. In some cases, access is not granted by SC chip 110 because the line may be in use by another CP cluster, or another chip in the same chip cluster 202 as CP chip 208. When a CP chip (e.g., CP chip 206) requests access to a target line (e.g., one of bus lines 118) and the local core or IO request misses in the local (on chip) L3 cache, CP chip 206 may load the request into an L3 LFAR logic 218, which is operating in local L3 cache of CP chip 206. LFAR logic 218 may be configured to act as a controller.

As shown in decision block 404, CP chip 206 may determine whether one or more other CP chips (e.g., CP chip 210 and CP chip 208) within CP cluster 202 are requesting access (sending one or more fetch requests) to a target line 118. In some embodiments, CP chip 206 broadcasts the fetch request to L4 cache located on SC chip 112 and the L3 cache 209 and 211, respectively on the two other CP chips 208 and 210. Accordingly, SC chip 112 acts as the on-cluster coherency master. The SC chip 112 processes the first request for a hot line it receives first. Subsequent requests from other CP chips on the cluster are rejected by SC chip 112 until the first is completed. The broadcasted request is loaded into CFAR logic 216 on SC chip 112 and into remote RFAR logic (controllers) 224 and 226 on the two other adjacent CP chips 208 and 210, respectively, in the CP cluster 202.

A special "extended valid" tag is set by RFAR logic 224 and RFAR logic 226 in the adjacent CP chips via a snoop broadcast from CP chip 206. The system may detect, via CP chip 208 and CP chip 210, the extended valid tag, and access the target line based on the extended valid tag. In some aspects, RFAR logic 224 and RFAR logic 226 may respectively execute a full address compare against a local fetch/local store (LF/LS) (not shown) on that respective chip. This compare operation may detect a condition indicative that this particular CP chip already has an outstanding miss request to the same target line being requested by another chip in the cluster.

As shown in block 406, CP chip 206 will wait for all three CP chips in the common cluster to access the target line. To ensure that another requesting chip (e.g., CP chip 206 and/or CP chip 208) on this same CP cluster 202 will not attempt to re-access the line before the other clusters (e.g., CP cluster 204) have a chance to access it, subsequent local core and IO request misses that encounter full address compares against RFARs with an "extended valid" tag will set and wait for that RFAR to either complete or drop the 'extended valid' pending before proceeding. According to some embodiments, the extended valid tag is indicative of whether the first CP chip already has an outstanding fetch request that has not accessed the target line based on an extended valid tag. This prevents new misses to the same address from broadcasting a second off-chip/cluster request for the same line until the currently outstanding fetches from the other chip or chips in the cluster have had a chance to access the hot line once.

This "extended valid" tag is maintained by the remote L3 RFAR logic 219 and 224 in CP chips 206 and 208, respectively. Subsequent new misses to the target line will set a "needs to wait" value from the remote L3 RFAR in 219 and 224, even if CP chip 210 received a reject response from the off-chip broadcast. A reject response indicates that another CP chip will access the line first before the remote RFAR 226 on CP chip 210 is given access.

As shown in block 408, system 100 will reset the "extended valid" tag when either 1) the respective L3 RFAR on a CP chip gains access to the target line and finishes the operation, 2) when a non-reject miss response is returned for the L3 RFAR's fetch, or 3) when a snoop request from SC chip 112 (or another SC chip such as SC chip 114 and/or SC chip 116) for an exclusive fetch indicates that the target line is being pulled off the cluster.

The present invention may be a system, a method, and/or a computer program product at any possible technical detail level of integration. The computer program product may include a computer readable storage medium (or media) having computer readable program instructions thereon for causing a processor to carry out aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for managing cache memory in a distributed symmetric multiprocessing computer, the method comprising:
   receiving, via a storage controller, a fetch request from a first central processor (CP) chip;
   determining whether one or more of a second CP chip and a third CP chip within a common chip cluster is requesting access to a target line; and
   providing access to the target line if both of the second CP chip and the third CP chip have accessed the target line at least one time since an earlier fetch from the first CP chip has accessed the target line.

2. The computer-implemented method of claim 1, wherein the first fetch request requests access to a target line managed by the storage controller and shared by the first CP chip, the second CP chip, and the third CP chip.

3. The computer-implemented method of claim 1, further comprising:
   loading, on a cache memory of the first CP chip, an outstanding fetch request that has not accessed the target line; and
   broadcasting, to the second CP chip and the third CP chip, information indicative of the outstanding fetch requests.

4. The computer-implemented method of claim 3, further comprising:
   detecting, via the second CP chip, an extended valid tag;
   accessing the target line based on the extended valid tag.

5. The computer-implemented method of claim 4, wherein the extended valid tag is indicative of whether the first CP chip already has an outstanding fetch request that has not accessed the target line based on an extended valid tag.

6. The computer-implemented method of claim 5, wherein accessing the target line based on the extended valid tag comprises:
   determining whether the extended valid tag is complete; and
   accessing the target line only after the extended valid tag is complete or dropped.

7. The computer-implemented method of claim 4, further comprising setting the extended valid tag stored on the first CP chip from second CP chip.

8. The computer-implemented method of claim 1, wherein the first CP chip compares all requests from the second CP chip and the third CP chip against an extended valid tag; and
   allows or prevents access to the target line to the second CP chip and the third CP chip.

9. The computer-implemented method of claim 1, wherein preventing or allowing access comprises:
   preventing the second CP chip or the third CP chip making a second fetch request from broadcasting additional fetch requests for an off-chip target line until the one or more of the second CP chip and the third CP chip making the second fetch request resets an extended valid tag stored on the requesting chip.

10. The computer-implemented method of claim 9, further comprising resetting the extended valid tag stored in the second CP chip and the third CP chip by the first CP chip after providing access to the target line.

11. A system for managing cache memory in a distributed symmetric multiprocessing computer comprising:
   a chip cluster comprising a first central processor (CP) chip, a second CP chip, and a third CP chip, wherein the first CP chip is configured to:
   receive a fetch request from the first CP chip;
   determine whether one or more of the second CP chip and the third CP chip within a common chip cluster is requesting access to a target line; and
   provide access to the target line if both of the second CP chip and the third CP chip have accessed the target line at least one time since an earlier fetch from the first CP chip has accessed the target line.

12. The system of claim 11, wherein the first fetch request requests access to a target line managed by a storage controller and shared by the first CP chip, the second CP chip, and the third CP chip.

13. The system of claim 11, further comprising:
   a cache memory on the first CP chip configured to load an outstanding fetch request that has not accessed the target line; and
   broadcast, to the second CP chip and the third CP chip, information indicative of the outstanding fetch requests.

14. The system of claim 13, wherein the second CP chip is configured to:
   detect an extended valid tag; and
   access the target line based on the extended valid tag.

15. The system of claim 14, wherein the extended valid tag is indicative of whether the first CP chip already has an outstanding fetch request that has not accessed the target line based on an extended valid tag.

16. The system of claim 15, wherein the second CP chip is configured to:
   determine whether the extended valid tag is complete;
   accessing the target line only after the extended valid tag is complete or dropped; and
   access the target line based on the extended valid tag.

17. The system of claim 14, wherein the second CP chip is configured to set the extended valid tag stored on the first CP chip.

18. The system of claim 11, wherein the first CP chip is configured to compare all requests from the second CP chip and the third CP chip against an extended valid tag; and
   allow or prevent access to the target line to the second CP chip and the third CP chip.

19. The system of claim 11, wherein the first CP chip is configured to prevent or allow access by preventing the second CP chip or the third CP chip making a second fetch request from broadcasting additional fetch requests for an off-chip target line until the one or more of the second CP chip and the third CP chip making the second fetch request resets an extended valid tag stored on the requesting chip.

20. The system of claim 19, wherein the first CP chip is further configured to reset the extended valid tag stored in the second CP chip and the third CP chip after providing access to the target line.

* * * * *